June 21, 1966   C. D. CUPP   3,256,910
VALVE ASSEMBLY FOR BREATHING APPARATUS
Filed Feb. 1, 1963   3 Sheets-Sheet 1

INVENTOR.
Charles D. Cupp
BY
Christel & Bean
ATTORNEYS.

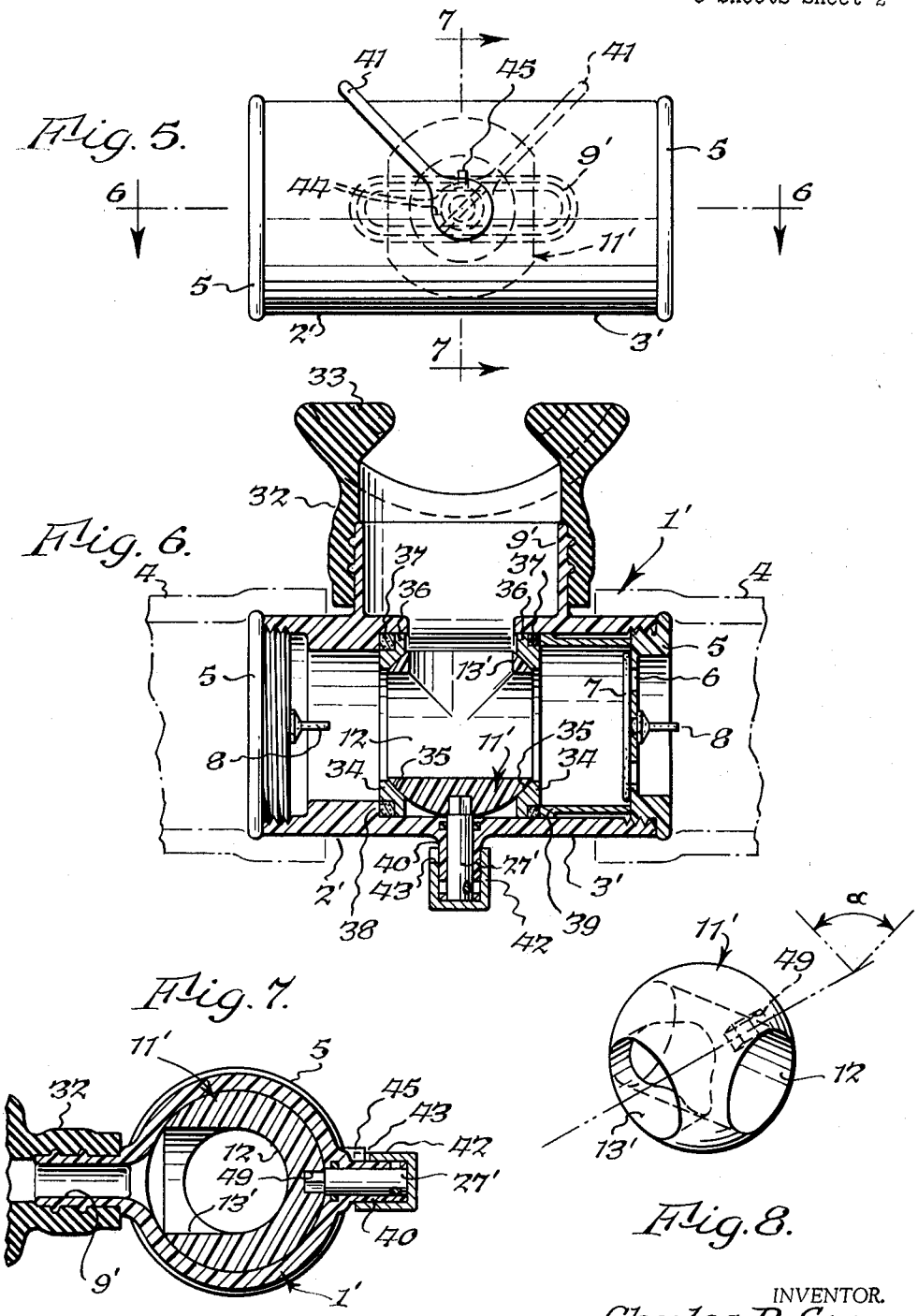

June 21, 1966    C. D. CUPP    3,256,910
VALVE ASSEMBLY FOR BREATHING APPARATUS
Filed Feb. 1, 1963    3 Sheets-Sheet 3
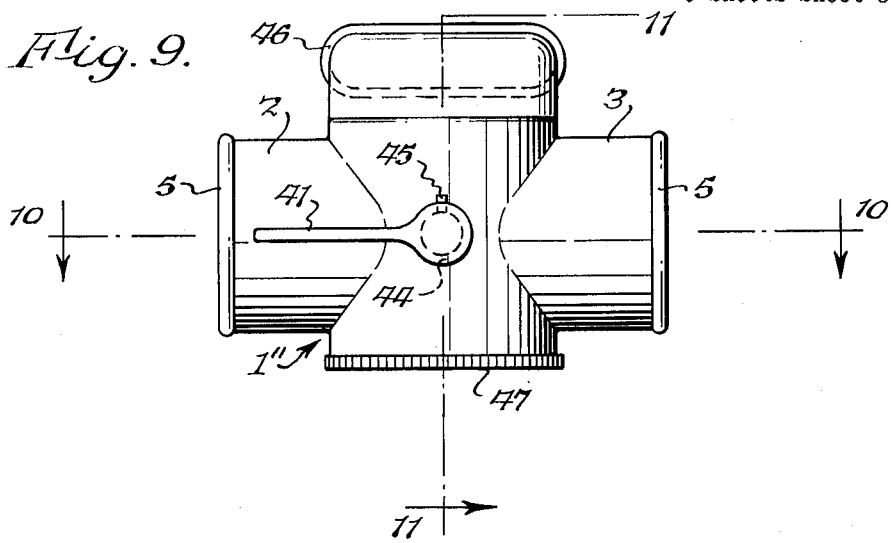
Fig. 9.
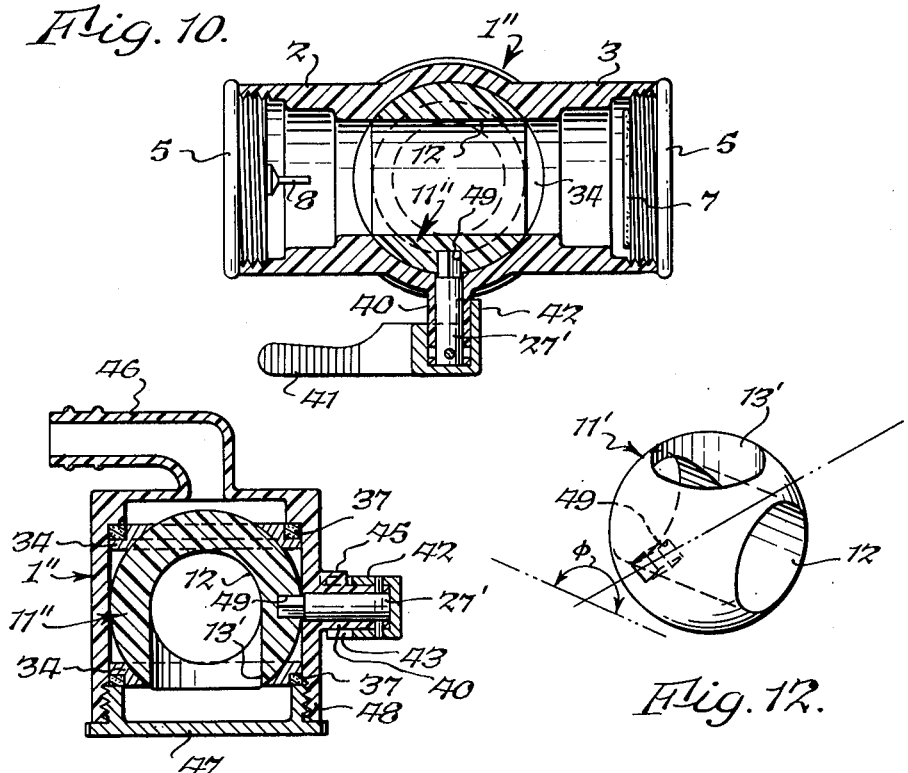
Fig. 10.
Fig. 11.
Fig. 12.
INVENTOR.
Charles D. Cupp
BY
Christel & Bean
ATTORNEYS.

United States Patent Office 3,256,910
Patented June 21, 1966

3,256,910
VALVE ASSEMBLY FOR BREATHING APPARATUS
Charles D. Cupp, Lancaster, N.Y., assignor to Scott Aviation Corporation, Lancaster, N.Y.
Filed Feb. 1, 1963, Ser. No. 255,486
2 Claims. (Cl. 137—625.41)

This invention relates generally to the valve art, and more specifically to a new and useful valve assembly particularly adapted for use in breathing apparatus.

It is sometimes desired to provide a shutoff valve in the T assembly connected to the mouthbit or face mask, as the case may be, of a breathing apparatus. For example, when used in conjunction with underwater exploration, the user will remove the mouthbit or mask upon surfacing. If the T assembly remains open, there is danger of water passing into the apparatus.

Accordingly, the primary object of my invention is to provide a shutoff valve for breathing apparatus T assemblies and the like, whereby the user can quickly interrupt communication between the breathing passage and the hose connections.

Another object of my invention is to provide the foregoing in a simple, readily assembled, durable, dependable, relatively inexpensive, and lightweight construction.

In one aspect thereof, a breathing apparatus valve assembly constructed in accordance with my invention is characterized by the provision of a valve body having first and second passages, a valve ball having first and second bores communicating with each other and with the first and second body passages when the ball is in one position, and means mounting the ball for rotation in a direction interrupting communication between one of the bores and the passage associated therewith, these last-named means including generally opposite journal members for sliding engagement with the ball, with one of the journal members having an annular bearing surface encircling the one ball in the one position of the ball and sealing the bore from the one passage when the ball is in another rotary position.

The foregoing and other objects, advantages and characterizing features of the valve assembly of my invention will become more clearly apparent from the ensuing detailed description of three illustrative embodiments thereof, considered in conjunction with the accompanying drawings wherein like reference numerals denote like parts throughout, and wherein:

FIG. 5 is a view corresponding to that of FIG. 1, but showing a modified form of valve assembly of my invention;

FIG. 6 is a view thereof, partly in plan and partly in horizontal section taken about on line 6—6 of FIG. 5;

FIG. 7 is a vertical sectional view thereof taken about on line 7—7 of FIG. 5;

FIG. 8 is a perspective view of the valve ball of this embodiment;

FIG. 9 is a view corresponding to that of FIG.1 but showing still another embodiment of my invention;

FIG. 10 is a view thereof, partly in plan and partly in horizontal section taken about on line 10—10 of FIG. 9;

FIG. 11 is a vertical sectional view thereof, taken about on line 11—11 of FIG. 9; and FIG. 12 is a perspective view of the valve ball of this embodiment.

Figure 1:
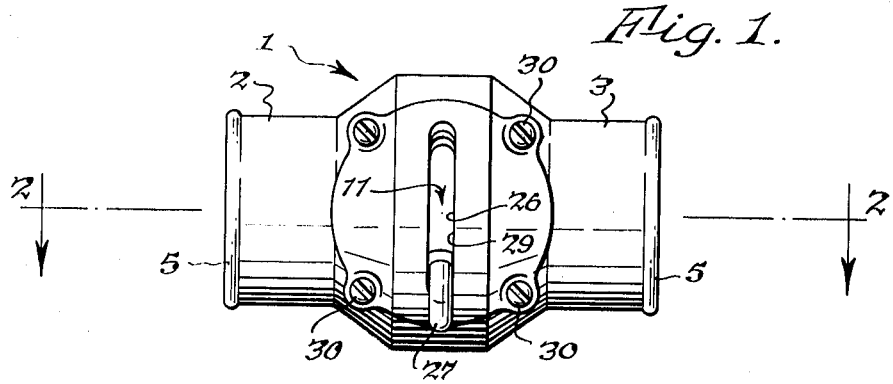
FIG. 1 is a front elevational view of one form of valve assembly of my invention.

Referring now in detail to the illustrative embodiments depicted in the accompanying drawings, there is shown in FIGS. 1-4 a valve assembly of my invention comprising a T shaped housing or body, generally designated 1, having a pair of opposed tubular sections 2 and 3 adapted for connection to the usual flexible hoses 4 leading to the remainder of the breathing apparatus. Sections 2 and 3 are threaded, to receive caps 5 which are apertured, as shown at 6, for passage of fluid under control of flapper check valves 7. Valves 7 are anchored to caps 5 by stems 8, and are arranged to permit only inhalation through section 3, and only exhalation through section 2.

Valve body 1 also is provided with a lateral tubular section 9 arranged for connection to a face mask, as indicated in phantom at 10, although the breathing section 9 can be adapted for connection to a mouthbit, and the like.

Thus, sections 2, 3 and 9 define exhalation, inhalation and breathing passages, respectively. Communication between the sections 2, 3 and 9 is under control of a valve ball, generally designated 11, having a diametral, through bore 12 and a radial, lateral bore 13 communicating therewith.

Valve ball 11 is journaled in body 1 for rotation about the axis of bore 12 by a pair of journal members 14, 20 arranged on opposite sides of the ball 11. Journal 14 is formed with an annular, semi-spherical bearing surface 15 in sliding, sealing contact with ball 11, and is provided with an annular, peripheral shoulder 16 receiving an annular sealing member 17, such as an O ring, which seats against an annular shoulder 18 around the inner end of breathing section 9.

The second journal member 20 also has a semi-spherical bearing surface 21 in sliding, sealing engagement with ball 11, and is provided with a peripheral shoulder 22 alined with an annular shoulder 23 in body 1, at the outer end of a lateral bore 19 therein. Shoulders 22, 23 jointly support an annular seal, such as the O ring 24.

Journal member 14 is provided with an opening 25 therethrough, of a size no smaller than the cross sectional size of bore 13, while journal member 20 is provided with a slot 26 receiving an actuating stem 27 carried by valve 11 and projecting through slot 26 for manual actuation to shift the rotary position of ball 11.

Figure 2:
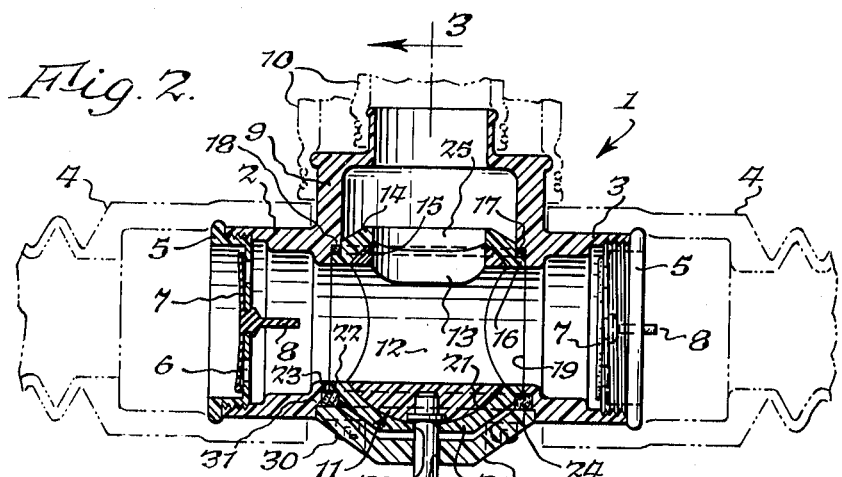
FIG. 2 is a view thereof, partly in plan and partly in horizontal section taken about on line 2—2 of FIG. 1, the connected hoses and mask being indicated in phantom.
Figures 3, 4:
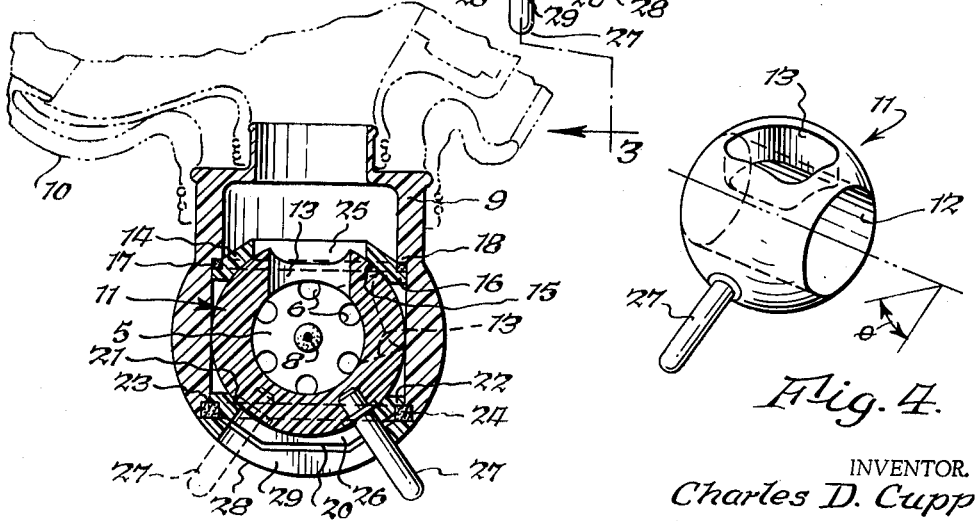
FIG. 3 is a vertical sectional view thereof, taken about on line 3—3 of FIG. 2.
FIG. 4 is a perspective view of the valve ball of this embodiment.

In its open position, shown in FIGS. 1 and 2 and in full lines in FIG. 3, the valve body bore 13 is in communication with breathing passage section 9, through the journal opening 25, and the bore 12 is in communication with the inhalation and exhalation passage sections 2 and 3. When it is desired to close the valve, the valve ball 11 is shifted to the position indicated in broken lines in FIG. 3, by grasping stem 27 and rotating the ball about the axis of bore 12. This moves the radial bore 13 out of alignment with journal passage 25 and breathing section 9, and journal member 14 provides a complete, closed seal between valve ball 11 and the breathing section 9.

In other words, journal member 14 provides a sliding seal between ball 11 and body section 9 at all times. In the "on" position, this seal encircles the bore 13. In the "off" position, it engages a surface portion of ball 11 other than that through which bore 13 opens, and thereby seals bore 13 out of communication with section 9. Journal 20 provides a seal between body 1 and ball 11 completely around stem 27, at all times.

The journal members 14, 20 and ball 11 are clamped in assembled position by a cover 28, slotted at 29 to accommodate stem 27, and held in position by screws 30. Cover 28 is received within an annular shoulder 31 around the body bore 19 through which valve ball 11 and journal members 14, 20 are assembled. Cover 28 bears against seal 24, and is held thereagainst with sufficient force to clamp the ball 11 between journal members 14, 20 in sliding engagement therewith, the clamping force providing sufficient friction to hold the ball in its adjusted position. This force is sufficient to hold seals 18 and 24 engaged with body 1, and to maintain a sliding seal between the ball and its journals, whereby an effective sealing action is provided without rubbing against an elastomer seal. The rubber seals 17 and 24 are static, and do not engage a relatively moving part, whereby they are long lasting.

Seals 17 and 24 and check valves 7 are made of rubber or other elastomeric material, while body 1, end members 5, journals 14 and 20, ball 11 and cover 28 preferably are made of a suitable plastic material, such as "nylon," or "Teflon" in the case of ball 11 and its journals 14 and 20.

Materials such as these are particularly suitable for the ball and journals, because they can be formed to provide smooth bearing surfaces and have a waxy characteristic making them self-lubricating. Stem 27 can be of metal, but preferably is of the same material as ball 11, whereby the entire assembly is of non-corrosive material. Stem 27 can be formed integral with ball 11.

To assemble the valve, journal 14, ball 11 and journal 20 are inserted in bore 19, in that order, and cover 28 is screwed into place. To disassemble the valve, the reverse procedure is followed. Therefore, there is provided a valve which is simple, dependable, durable and readily assembled and disassembled.

To move ball 11 between its "on" and "off" positions, it is only necessary to grasp stem 27 and swing it through the angle $\theta$ (FIG. 4).

Referring now to the embodiment of FIGS. 5–8, there is provided a housing 1' having inhalation and exhalation passage sections 2' and 3' adapted for connection to hoses 4. Here, breathing section 9' is shown connected to a mouthbit 32 of known type, having the portions 33 adapted to be clamped between the teeth.

As before, the valve ball 11' is provided with a diametral, through bore 12 and with a radial lateral bore 13' communicating with the passages 2', 3' and 9'. However, in this instance the ball is rotated about the axis of bore 13', whereby journal members 34 normally encircle the opposite ends of through bore 12 in the "on" position of the valve. Each journal member 34 is provided with a semi-spherical, annular bearing surface 35 having sliding, sealing engagement with ball 11'. Each journal member also is provided with an annular, peripheral shoulder 36, receiving an O-ring or other seal 37. One journal member 34 is seated against a shoulder 38 at the inner end of section 2', while a removable sleeve 39 bears against the seal 37 of the other journal member 34, being urged thereagainst by the end cap 5 of section 3' to hold the ball and journals assembled with sufficient friction to retain the ball in adjusted position.

In this instance, the valve stem 27' is journaled in an extension 40 of body 1', and connected to an actuating arm 41 having a sleeve 42 pinned to shaft 27'. Sleeve 42 is cut away, at 43, to provide a pair of stop shoulders 44 abutting a stop 45, carried by body 1', at opposite ends of the path of movement of arm 41 through angle $\alpha$ (FIG. 8).

In the "on" position, bore 12 communicates with sections 2' and 3' through the annular journals 34 which extend around the inner ends of these sections in sealing engagement with ball 11'. In the "off" position, ball 11' is rotated about the axis of bore 13', moving bore 12 out of communication with sections 2', 3', and journals 34 seal the inner ends of these sections against solid surface portions of ball 11'.

In the embodiment of FIGS. 9–12, the valve body 1" has inhalation and exhalation sections 3 and 2, as before. However, in this embodiment the breathing passage is in a bent section 46 which can be connected either to a mouthbit or to a mask. The journals 34 are similar to those shown in FIGS. 5–7, except that they are held assembled by a cover 47 threaded into a section 48 of housing 1", opposite to breathing section 46.

In this arrangement the ball 11' is rotated a greater angular distance $\phi$ (FIG. 12) to shift the radial bore 13' out of communication with breathing section 46, to the position shown in FIG. 11 in which both bores are out of communication with the breathing section.

The valve of this embodiment is assembled in the same manner as the valve in the embodiments of FIGS. 1–4 and 5–8. That is to say, first a journal 34, then ball 11' and finally the second journal 34 are inserted in the lateral body, following which the cap 47 is threaded into place. However, like the embodiment of FIGS. 5–8, and unlike the embodiment of FIGS. 1–4, the stem 27' must be inserted in the socket 49 provided in ball 11' after the ball has been positioned in the body.

Thus, in each embodiment there is provided a ball journaled in a pair of members providing a seal. In the form of FIGS. 1–4, the ball is rotated about the radial bore axis, in the embodiment of FIGS. 5–8, it is rotated about the diametral bore axis, and in the embodiment of FIGS. 9–12 it is rotated about an axis normal to the plane containing the two bore axes. In FIGS. 1–4 and 9–12, the breathing passage is sealed when the valve is off, while in FIGS. 5–8, the inhalation and exhalation passages are separately sealed when ball 11' is in its "off" position. In each instance, the ball and journals provide the seal.

Accordingly, it is seen that my invention fully accomplishes its intended objects. While I have shown and described in detail only three embodiments of my invention, that has been done by way of illustration, not limitation. Such variations and modifications as will occur to those skilled in the art are intended to be included within the scope of the appended claims.

Having fully disclosed and completely described my invention, and its mode of operation, what I claim as new is:

1. A valve assembly for breathing apparatus comprising, a valve body having opposed inhalation and exhalation passages and a lateral breathing passage, a rotary valve ball having a diametral bore communicating with said inhalation and exhalation passages and a radial bore communicating with said breathing passage in one position of said ball, said ball being rotatable about the axis of said diametral bore to position said radial bore out of communication with said breathing passage, a pair of opposed journal members each having a semispherical bearing surface in sliding engagement with said ball, one of said journal members comprising an annulus encircling and sealing said radial bore in said one position of said ball and sealing said radial bore from said breathing passage in another rotary position of said ball, drive means operatively associated with said ball and extending through the other of said journal members, and seals carried by said journal members in sealing engagement with said body, said body including a member clamping said journal members against said ball, said clamping member including an aperture for said drive means.

2. The valve structure according to claim 1 wherein each of said exhalation and inhalation passages include means for connection to said breathing apparatus.

(References on following page)

References Cited by the Examiner

UNITED STATES PATENTS

| | | | |
|---|---|---|---|
| 1,384,893 | 7/1921 | Horine | 137—625.47 |
| 2,698,731 | 1/1955 | Koehler et al. | 137—625.47 |
| 3,056,418 | 10/1962 | Adams et al. | 251—315 X |
| 3,100,499 | 8/1963 | Bass | 251—315 |
| 3,101,752 | 8/1963 | Martin | 251—315 X |

FOREIGN PATENTS 704,913  3/1954  Great Britain.

MARTIN P. SCHWADRON, *Acting Primary Examiner.*

LAVERNE D. GEIGER, M. CARY NELSON,
*Examiners.*

A. ROSENTHAL, *Examiner.*